United States Patent [19]
Ikeuchi

[11] Patent Number: 5,608,819
[45] Date of Patent: Mar. 4, 1997

[54] IMAGE PROCESSING SYSTEM UTILIZING NEURAL NETWORK FOR DISCRIMINATION BETWEEN TEXT DATA AND OTHER IMAGE DATA

[75] Inventor: Takenobu Ikeuchi, Kawasaki, Japan

[73] Assignee: Matsushita Electric Industrial Co., Ltd., Osaka, Japan

[21] Appl. No.: 245,264

[22] Filed: May 18, 1994

[30] Foreign Application Priority Data

Jul. 19, 1993  [JP]  Japan .................................. 5-177802

[51] Int. Cl.$^6$ ................................................. G06K 9/62
[52] U.S. Cl. ............................ 382/156; 382/176; 358/462
[58] Field of Search ................................... 382/9, 14, 15, 382/155, 156, 157, 158, 173, 176, 190, 270, 282, 288, 304; 358/453, 455, 456, 457, 462, 464, 467

[56] References Cited

U.S. PATENT DOCUMENTS

| | | | |
|---|---|---|---|
| 4,965,443 | 10/1990 | Yamasaki et al. | 250/201.7 |
| 4,974,010 | 11/1990 | Cleveland et al. | 354/403 |
| 5,187,592 | 2/1993 | Sugiyama | 358/430 |
| 5,309,505 | 5/1994 | Shimomura et al. | 382/157 |
| 5,331,550 | 7/1994 | Stafford et al. | 382/14 |
| 5,337,370 | 8/1994 | Gilles et al. | 382/14 |
| 5,384,647 | 1/1995 | Fukushima | 358/456 |
| 5,387,983 | 2/1995 | Sugiura et al. | 382/9 |

OTHER PUBLICATIONS

"Parallel Distributed Processing" by Rumelhart D. E., McClelland J. L. and PDP Research Group, M.I.T. Press, 1986; Chapters 8 & 11.

Primary Examiner—Leo Boudreau
Assistant Examiner—Phuoc Tran
Attorney, Agent, or Firm—Lowe, Price, LeBlanc & Becker

[57] ABSTRACT

An image processing system, which operates on an input image data stream consisting of successive multi-level values, effecting a plurality of respectively different types of image data processing in accordance with a plurality of different categories of the input image data, utilizes a neural network to assign each datum to a specific category, with resultant output signals from the neural network being used to select the appropriate type of image data processing for that datum.

12 Claims, 11 Drawing Sheets

| a | b | c | d | e |
|---|---|---|---|---|
| f | g | h | i | j |
| k | l | m | n | o |

IMAGE PROCESSING SYSTEM UTILIZING NEURAL NETWORK FOR DISCRIMINATION BETWEEN TEXT DATA AND OTHER IMAGE DATA

BACKGROUND OF THE INVENTION

1. Field of the Invention

The present invention relates to an image data processing system for use in image processing equipment such as a facsimile apparatus, printer, copier, etc., for the purpose of converting multi-level image data to processed image data such as binary data. In particular, the invention relates to a system wherein the image data are judged as expressing either text data or other image data such as halftone data, and selecting the type of image processing in accordance with the judgement results.

2. Description of the Related Art

There are some cases in which it is necessary to execute respectively different types of image processing in accordance with the contents expressed by an input image Signal, i.e. an input image data stream consisting of successive multi-level picture element values. In the case of a facsimile apparatus which produces binary data to be transmitted to a remote apparatus, a document page is scanned to obtain successive multi-level picture element values. The picture element values which correspond to text regions of the document page are compared with a threshold value, and converted directly to corresponding binary data. However, picture element values corresponding to halftone regions may be subjected to pseudo-halftone image processing, such as dither processing, to obtain binary data which will produce a pseudo-halftone image when subsequently printed. In such a case, it is necessary to have a capability for discriminating between text data and halftone data contained in the image data that is obtained by scanning the original document page, with such a function being referred to in the following as image region judgement. Various methods which have been proposed in the prior art for executing image region judgement include a method based on a power of a specific spatial frequency contained in the input image signal, a method utilizing differences in density between adjacent picture elements, a method based on differences between numbers of transitions between the black and white levels within a specific region, a method based on a fixed area density hystogram, etc.

As a specific example of such prior art methods of image region judgement, an image data processing system will be described which uses the power of a specific spatial frequency contained in the input image signal, referring to FIGS. 1, 2. In FIG. 1, an input image signal is supplied to an input terminal 1. The power of a specific spatial frequency within the input image signal is derived by a Fourier transform section 20, and supplied to a text/halftone discrimination section 21, which judges (i.e. for an object picture element value) whether the magnitude of the power derived by the text/halftone discrimination section 21 indicates that the object picture element value corresponds to a text region or to a halftone region of the input image. A pseudo-halftone processing section 4 executes pseudo-halftone processing of the input image data using a method such as dither processing. A bi-level conversion section 6 executes bi-level conversion processing of the input image data, and the respective processed image data outputs from the pseudo-halftone processing section 4 and bi-level conversion section 6 are supplied to input terminals designated A and B of a data selector 5, which selects one of these two types of processed image data in accordance with a decision signal that is supplied to an input terminal S thereof, to be transferred to an output terminal 7. That is to say, the type of processed image data is selected in accordance with whether it has been judged that the image data currently expressed by the input image signal are from a text region or a halftone region of an original image such as a document page.

FIG. 2 is a simple table showing the relationships between the two states of the selection signal from the text/halftone discrimination section 21 which is supplied to input terminal S of the data selector 5, and the corresponding inputs which are selected by the data selector 5.

However with such a prior art type of image data processing system, various problems arise in practice. A first problem is that it is necessary for a human operator to decide on the threshold value of spatial frequency (that frequency being referred to in the following as the reference frequency) which is to be utilized for discriminating between text data and halftone data contents of the input image signal, based on the output obtained from the Fourier transform section 20. It is difficult for a human operator to decide on a suitable value for the reference frequency. That is due to the fact that the appropriate value of the reference frequency will vary in accordance with various conditions which affect the conversion of the multi-level input image data (e.g. derived by scanning a document page) to binary data. The effects of such varying conditions will be referred to as the diversity of the input image data. For example, the operation may be affected by actions performed by a user, such as executing shading correction, variation of the threshold value that is used for converting text image data to binary data, etc. Furthermore, assuming that the input image data has been generated by scanning a document page using an optical scanner, then variations in the resultant input image data produced from the scanner can result from changes in the degree of tilt of the document sheet while being scanned, variations in the operating temperature of the image processing system, the effects of dust within the scanner, etc. Moreover if the scanned image contains pseudo-halftone contents (in addition to text regions and true halftone regions) then that will further increase the degree of diversity of the input image data. It is necessary for an image data processing system which handles such input image data to be designed such as to be capable of executing appropriate image processing irrespective of such diversity of the input image data. Hence, the design of such an image data processing system becomes extremely difficult.

Furthermore, another problem is that the diversity of the input image data is caused by a variety of different factors, so that it is necessary for a human operator to perform a large number of tests and adjustments, in order to determine a suitable value for the reference frequency. In addition, the design of the image data processing system becomes complex, due to the need to provide capabilities for counteracting all of the various effects which result in the diversity of the input image data.

In addition, if the text/halftone discrimination section utilizes the Fourier transform method, as in FIG. 1, so that a decision is made as to whether the input image data is currently representing a halftone region or a text region of the input image based on the magnitude of the power of the reference frequency that is obtained by the Fourier transform section, then if the reference frequency value is not appropriate, accurate discrimination cannot be achieved. To attempt to ensure that accurate discrimination between text and halftone data can be achieved, it has been proposed to provide a plurality of reference frequencies. However due to the fact that the algorithm becomes complicated, designing the image data processing system becomes even more difficult, and the circuit scale becomes large.

There is therefore a requirement for an image data processing system which can cope with considerable diversity of the input image data supplied thereto, but which can avoid the above problems of the prior art.

SUMMARY OF THE INVENTION

It is an objective of the present invention to overcome the problems of the prior art set out above, by providing an image data processing system which includes a neural network that has previously undergone a suitable neural network learning procedure. The learning procedure is executed to enable the neural network to operate on successive input image data patterns supplied thereto (extracted from an input image signal which is being processed by the image data processing system) such that an output signal or a set of output signals from the neural network can be used to accurately decide whether the input image signal is currently conveying text data or other data (e.g. halftone data, or noise). The amplitude of the output signal (or signals) produced from the neural network can be compared with a predetermined threshold value to obtain binary data, and a judgement made as to whether text data or halftone data are currently being supplied as the input image data, in accordance with the state of the binary data derived from the neural network output.

More specifically, according to a first aspect, the present invention provides an image data processing system for operating on a stream of input image data consisting of successive multi-level picture element values supplied in respective sample periods, for selectively processing the input image data in accordance with a plurality of predetermined categories of the input image data, the system comprising:

data array extraction means for extracting from the input image data stream, in each of the sample periods, a set of picture element values including an object picture element value, the set corresponding to an array of successively adjacent picture elements;

a plurality of image processing means each coupled to receive the input image data stream, functioning in each sample period to generate respective processed image data in response to the object picture element value;

neural network means which has been subjected to a predetermined learning procedure, responsive to the set of image data for judging the object picture element value as being within a specific one of the categories, and for producing output data indicative of the specific category; and data selector means controlled by the output data from the neural network means for selecting processed image data produced from one of the plurality of image processing means, and for outputting the selected processed image data.

According to a second aspect, the invention provides an image data processing system for operating on a stream of input image data consisting of successive multi-level picture element values supplied in respective sample periods, for selectively processing the input image data in accordance with a plurality of predetermined categories of the, the system comprising:

data array extraction means for extracting from the input image data stream, in each of the sample periods, a set of picture element values including an object picture element value, the set corresponding to an array of successively adjacent picture elements;

characteristic quantity derivation means for operating on the set of picture element values to derive a set of characteristic quantities, the characteristic quantities expressing respectively different parameters of the array of successively adjacent picture elements;

a plurality of image processing means each coupled to receive the image data stream, functioning in each sample period to generate respective processed image data in response to the object picture element value;

neural network means which has been subjected to a predetermined learning procedure, responsive to the set of characteristic quantities for judging the object picture element value as being within a specific one of the categories, and for producing output data indicative of the specific category; and data selector means controlled by the output data from the neural network means for selecting processed image data produced from one of the plurality of image processing means.

The characteristic quantity derivation means can for example comprise means for calculating, as one of the characteristic quantities, an average value of the set of picture element values, and/or means for calculating an average value of a subset of the set of picture element values, the subset corresponding to a linearly successively adjacent group of the picture elements within the array.

The image data processing system may further comprise means for delaying the output data produced from the neural network means during each sample period, to obtain delayed output data, and for inputting the delayed output data to the neural network means in an immediately succeeding sample period. Such a feature makes use of the fact that there is a high probability that immediately successive picture element values may fall within the same category, e.g. the category of text image data.

Such an image data processing system may be further supplied with operating condition data relating to an apparatus operating condition which may affect the judgement executed by the neural network, such as the operating temperature of the image processing system, with such operating condition data being inputted to the neural network means in conjunction with the set of picture element values, in each image data sample period.

Furthermore with such an image data processing system, if one of the plurality of image processing means comprises bi-level conversion means for converting the input image data to binary data by comparing the input image data with a variable-level threshold value, then that variable-level threshold value can be inputted to the neural network means in conjunction with the set of picture element values, in each image data sampling period.

In addition, with such an image data processing system, if one of the categories is the category "signal noise", and the processed image data are binary data, the system can further comprise means responsive to output data from the neural network indicating that the object picture element is within the noise category, for holding a processed image data output terminal of the image data processing system at a fixed logic level.

As is well known, a neural network can be "taught" to provide an output signal (or combination of output signals) varying in any desired arbitrary manner in response to arbitrarily determined input patterns, i.e. in response to arbitrary combinations of input signal values. Thus, by performing a suitable learning procedure prior to utilizing a neural network in an image processing system, so that all of the possible factors which can affect the determination of the type of image processing that is to be applied to each input image datum (e.g. the effects of varying degress of tilt of a document page which is scanned to provide input image data, the effects of variations in the operating temperature of the image processing system, etc.) will be automatically taken into account, then all of the problems of the prior art described hereinabove can be overcome. That is to say, design of the image processing system is simplified, it becomes unnecessary to perform various tests and adjustments in order to achieve satisfactory performance, and (since Fourier transform derivation is not necessary) there is no need to establish a reference frequency value.

Other advantages and features of the invention will be made clear from the following description of embodiments.

DESCRIPTION OF PREFERRED EMBODIMENTS

Figures 1, 2:
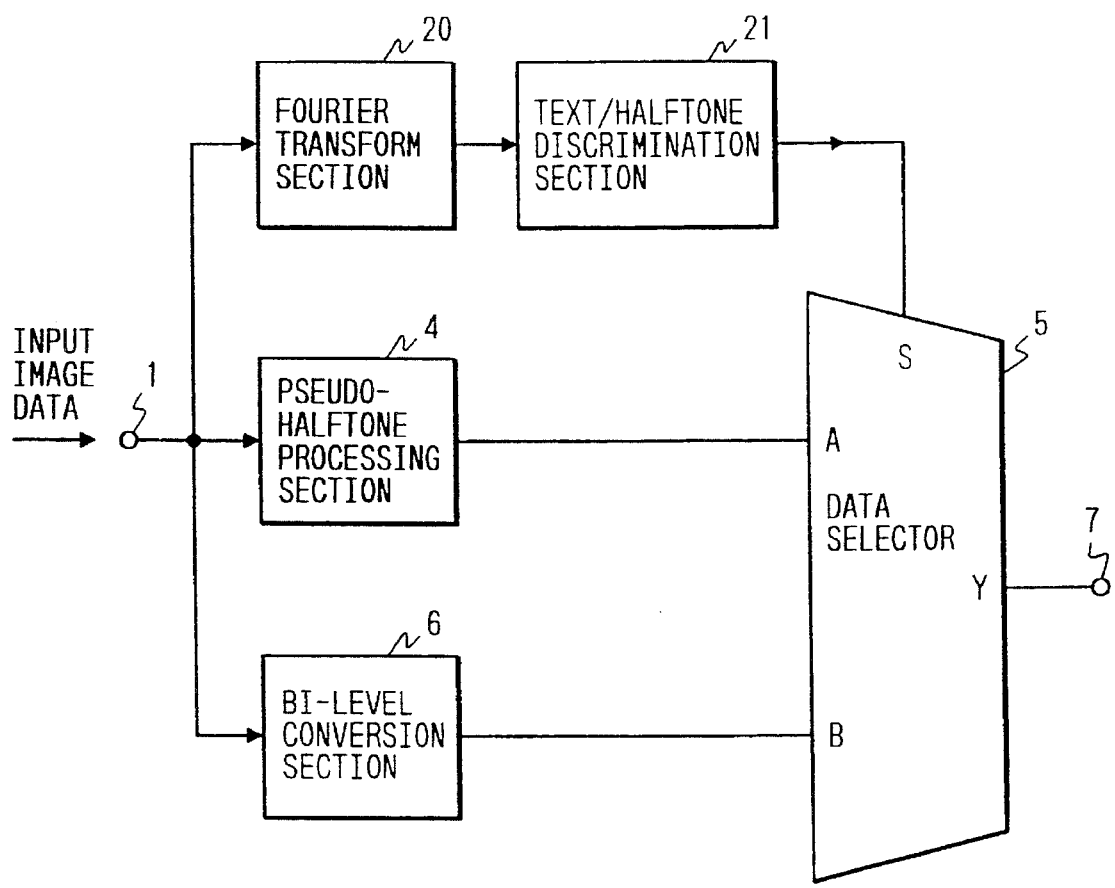
FIG. 1 is a general block system diagram of an example of a prior art type of image data processing system.
FIG. 2 is a table of switching conditions for a data selector in the image data processing system of FIG. 1.

The present invention provides an image data processing system incorporating a neural network, which operates on a stream of multi-level input image data, with an output signal (or combination of signals) produced from the neural network being used as a basis for judging the type of input image data that is currently being supplied, and with the type of image processing applied to the input image data being selected in accordance with the judgement results. Specifically, the neural network is utilized to allocate each input image datum to one of a plurality of categories, for example a category of "text image data", and the category "any non-text image data". As is well known, before utilizing a neural network it is necessary to "teach" the network, using a specific learning procedure, to respond in a desired manner to various different types of input data which could be supplied to it during actual operation. The effect of the learning procedure is to alter various internal parameters of the neural network in a direction such as to obtain the desired type of response.

In the learning procedure, it is necessary to apply successive input data patterns to the neural network, while comparing the resultant successive output values produced from the neural network with the corresponding values of a teaching signal. These values of the teaching signal are predetermined as being correct in relation to the respective input data patterns. Each input data pattern might for example consist of a set of picture element values (e.g. for an array of mutually adjacent picture elements, obtained during scanning of a page of text), together with a value of operating temperature of the image processing system, produced from a temperature sensor. In that case the teaching signal would be set to a predetermined value e.g. the binary '1' level, and the difference between each output value produced from the neural network in response to such an input pattern would be compared with the corresponding teaching signal value, and the difference between these used to modify the parameters of the neural network, by using a suitable algorithm. Other input data patterns used in the teaching procedure could be derived by scanning halftone images. In that case, the teaching signal would be set to the '0' level.

Various types of algorithm are known for use in such a neural network teaching procedure. A neural network basically consists of an input layer of elements which function as distribution elements, one or more intermediate layers of neuron elements, and an output layer (which may consist of only a single neuron element). During normal use of the neural network, each input data pattern is supplied to the input layer, and resultant data then propagates through the network to the output layer, i.e. by forward propagation. During the teaching procedure, a teaching algorithm may be used which executes backward propagation when altering the network parameters.

Such a teaching procedure should use a wide diversity of different input data patterns, reflecting as many as possible of the various different conditions which may affect the input image data that will be supplied to the image data processing system during normal operation, e.g. variations in operating temperature, variations in tilt of the document sheet during scanning, etc. During the teaching procedure a sequence of such data patterns is repetitively supplied, and the neural network parameters accordingly adjusted successively, until a sufficient degree of convergence of the parameter values is achieved. The number of different conditions that are taken into account in the teaching procedure will be determined by the designer in accordance with the performance that is required for the image data processing system.

Various types of neural network have been proposed in the prior art, such as the multi-layer Perceptron network, the LVQ network, etc. However, the present invention is not dependent on the use of any specific configuration of neural network. The concept of the neural network was described by Pits and McCulloch in the 1940's, as a network of elements which modelled the neurons of the brain. Various information concerning teaching procedures for neural networks is provided in "Parallel Distributed Processing" by Rumelhart D. E., McClelland J. L. and PDP Research Group, M.I.T. Press, 1986.

The size of the neural network is partly determined by the number of elements constituting the input layer, from which various outputs branch to the first intermediate layer of neuron elements of the network. The number of elements of the input layer is determined by the amount of information contained in each data pattern which will be supplied to the neural network. The neural network is used to classify each input data pattern into one of a plurality of predetermined categories (e.g. the categories of text data and non-text data). The number of categories which must be judged determines the number of neuron elements constituting the output layer of the network. If there are only two categories then only a single output neuron is required, if there are three categories then the output layer would consist of two neuron elements, and so on.

With the present invention, an object picture element value (i.e. the picture element value, from the input image signal, which is currently to be processed by the image data processing system) is situated within an array of picture element values which are being supplied as part of the input data pattern to the neural network, so that the output signal from the neural network can be used to judge whether the object picture element should be processed as text data or as halftone data.

By using a neural network in an image data processing system, the various problems of the prior art described above can be overcome. That is to say, by utilizing a sufficient diversity of image data derivation conditions to obtain the input data used in the teaching procedure, it becomes unnecessary for a designer to design an image data processing system such as to take into account the diversity of image data that will occur during normal operation. In addition, it is unnecessary for testing and adjustment to be performed in order to obtain a desired level of performance for the image data processing system, so that the first and second problems described hereinabove are overcome.

Moreover, discrimination between input text data and halftone data can be easily achieved, e.g. by executing a teaching procedure whereby, during actual use of the neural network, a relatively high-amplitude output signal will be produced from the output layer of the neural network in response to input of text data, and a relatively low-amplitude output signal produced in response to output of halftone data. After completing such a teaching procedure, discrimination between text and halftone data can be very easily achieved simply by comparing the output signal (or plurality of output signals) from the neural network with a suitable threshold value, to obtain corresponding binary data.

Figures 3, 4:
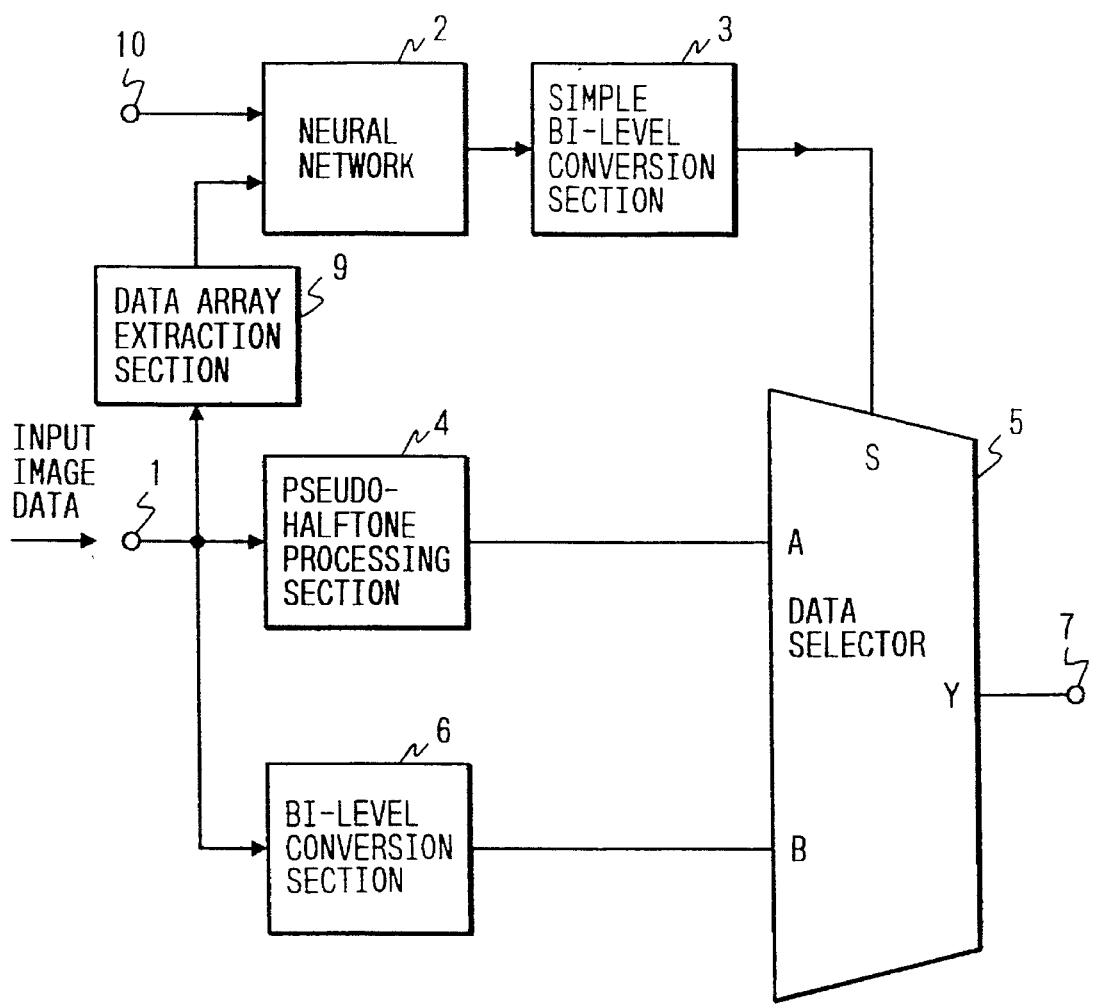
FIG. 3 is a general block system diagram of a first embodiment of an image data processing system according to the present invention.
FIG. 4 is a table of switching conditions for a data selector in the embodiment of FIG. 3.

FIG. 3 is a general block system diagram of a first embodiment of an image data processing system according to the present invention, and FIG. 4 is a table which illustrates the operation of a switching circuit in FIG. 3. In FIG. 3, a data array extraction section 9 receives a stream of input image data which are applied to an input terminal 1, and supplies successive sets of extracted data to a neural network 2. An output signal $O_s$ produced from the neural network 2 is converted to binary data by a simple bi-level conversion section 3, to obtain a switching control signal which controls a data selector 5. The input image data are also supplied to a pseudo-halftone processing section 4, and to a bi-level conversion section 6. Output signals from the pseudo-halftone processing section bi-level conversion section 6 are supplied to the data selector 5.

Figures 5, 6:
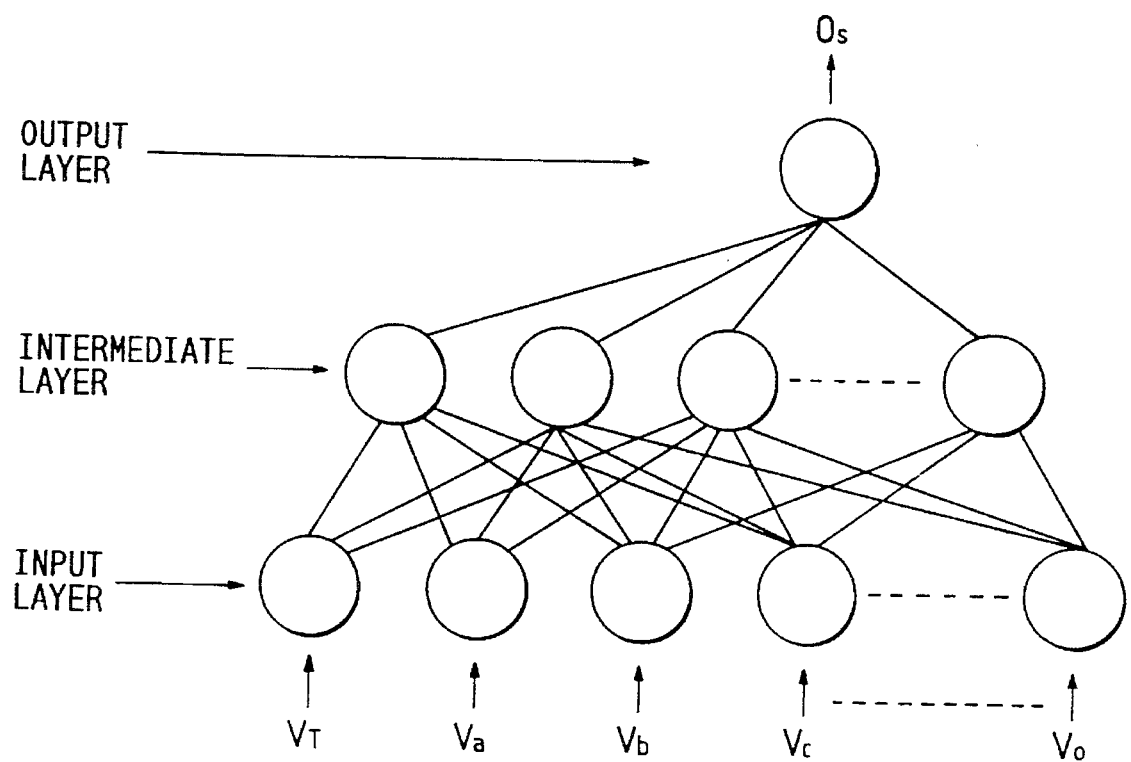
FIG. 5 shows an array of picture elements for which respective values are applied to a neural network in the embodiment of FIG. 3.
FIG. 6 illustrates the configuration of the neural network in the embodiment of FIG. 3.

The input image data consist of successive picture element values, which are supplied to the input terminal 1 in respective sample periods. The picture element values are multi-level values, and it will be assumed that these have been derived by scanning of a document page by an optical scanner, however the picture element values could be derived from other sources. Successive multi-level values representing equipment operating temperature values, derived by a temperature sensor, are supplied as a temperature indication signal to an input terminal 10. Here it is assumed that a single temperature indication signal is used which, for example, indicates the operating temperature of the image processing system. The data array extraction section 9 extracts from the input image data, during each sample period, a set of picture element values which are inputted in parallel to the neural network 2, together with the temperature signal values from input terminal 10. That set of picture element values corresponds to an array of 15 picture elements, which are shown in FIG. 5, designated as 'a' to 'o', i.e. 3 sets of 5 successively adjacent picture elements, of three successive scan lines. Circuits for performing such an array extraction function are well known in the art, i.e. to in effect form a scanning window with respect to the original image, with that window being moved by one picture element position or one scan line in each sample period. For that reason, description of the data array extraction section 9 will be omitted.

The output signal $O_s$ produced from the neural network 2 varies within a fixed range of values, whose upper limit corresponds to the binary '1' level and whose lower limit corresponds to binary '0'. The output signal $O_s$ is compared with a fixed threshold value in the bi-level conversion section 3 (which will be referred to as a "simple bi-level conversion section", to distinguish it from a conversion section which utilizes a variable threshold value), to be converted to binary data, functioning as a switching control signal Sc. That switching control signal is applied to a control input S of the data selector 5.

The pseudo-halftone processing section 4 processes the input image data to obtain pseudo-halftone data, which are supplied to an input A of the data selector 5. The pseudo-halftone processing section 4 utilizes a known type of method such as the error diffusion method or the dither method, for processing the input image data.

The bi-level conversion section 6 compares the input image data with a threshold value, (which may be a variable value, for example which may be adjustable by the user of the image data processing system) to convert the multi-level input image data to corresponding binary image data. The resultant binary image data are supplied to an input terminal B of the data selector 5.

Although not shown in FIG. 3 for simplicity of description, respective delay elements are provided in the path between the input terminal 1 via the bi-level conversion section 6 to the B input terminal of the data selector 5, and in the path between the input terminal 1, via the pseudo-halftone processing section 4 to the A input terminal of the data selector 5. These delay elements provide respective degrees of delay such as to ensure that the switching operations of the data selector 5 are synchronized with the processed data produced from the pseudo-halftone processing section 4 and from the bi-level conversion section 6, i.e. to ensure that when a decision is made by the neural network concerning an object picture element value, the processed image data corresponding to that object picture element are being respectively inputted to the A and B terminals of the data selector 5.

The data selector 5 transfers either the output data from the pseudo-halftone processing section 4 or the data from the bi-level conversion section 6 to an output terminal Y thereof, and hence to an output terminal 7 of the image data processing system, in accordance with the state of the switching control signal Sc, as illustrated in the table of FIG. 4. As shown, when the output signal $O_s$ from the neural network 2 is close to the logic 1 level so that the signal Sc is at the logic 1 level, indicating that the object picture element (i.e. the picture element for which an output value is currently being produced from the bi-level conversion section 6) is part of a text region, then the output data from the bi-level conversion section 6 are selected to be transferred by the data selector 5. However when the output signal $O_s$ of the neural network 2 is close to the logic 0 level so that the signal Sc is at the logic 0 level, indicating that the object picture element is not part of a text region, then the output data from the pseudo-halftone processing section 4 are selected to be transferred by the data selector 5 to the output terminal 7. In that way, text region image data and halftone picture region image data will be respectively appropriately processed, and the accuracy of discrimination between text and non-text image data by the neural network will be unaffected by changes in operating temperature.

The configuration and operation of the neural network 2 will be described referring to FIGS. 6 and 7. FIG. 6 shows a suitable configuration for the neural network 2, which can be of a type such as the multi-layer Perceptron, although other types of neural network can be equally utilized. The neural network is formed of elements each represented by a circle, which are arranged as shown, as an input layer, an intermediate layer and an output layer. The respective picture element values of the picture element array shown in FIG. 5 are inputted to the elements of the input layer, these values being designated as $V_a, V_b, \ldots V_o$ respectively, while the temperature signal value (designated as $V_T$) from the input terminal 10 of FIG. 3 is also applied to an element of the input layer. Each element of the input layer distributes the input signal value applied thereto, to produce a plurality of output values. Each of these output values is multiplied by a specific weighting coefficient, and the resulted weighted signal values are supplied to the neuron elements which constitute the intermediate layer of the neural network, as shown. Each neuron element produces an output value which varies, with respect to the sum of the weighted input values supplied thereto, in accordance with a non-linear function such as a sigmoid function. The resultant output values from the neuron elements of the intermediate layer are multiplied by respective weighting coefficients, and the resultant values are inputted to a single neuron element which constitutes the output layer of the neural network of this embodiment. That output neuron element functions in the same manner as described for the neuron elements of the intermediate layer, to obtain an output value $O_s$ that is determined in accordance with the pattern of input signal values $V_T, V_a, V_b, \ldots V_o$ and the weighting coefficients that have been established beforehand for the neural network during a teaching procedure.

Before using the neural network of FIG. 6 in the image data processing system of FIG. 3, a neural network learning procedure must be performed as described hereinabove, whereby the respective values of the weighting coefficients of the neural network become adjusted to values such that the output signal $O_s$ from the neural network will be close to the logic '1' level when the combination of input signal values to the neural network indicate that the object picture element is part of a text region, and will be close to the logic '0' level otherwise. FIG. 7 is a block system diagram for illustrating the learning procedure. A teaching data generating section 50 functions to successively generate combinations of input signal values for the neural network 2 (each combination representing a set of 15 picture element values and a temperature indication signal value, corresponding to the signal values $V_a$ to $V_o$ and $V_T$ of FIG. 6), these input signal values being referred to as the learning input data, together with corresponding successive values of a teaching signal. When such an input signal combination is predetermined such that the object picture element value (i.e. the value $V_h$ of the set of input values $V_a$ to $V_h$ in FIG. 6) corresponds to a text picture element, then the teaching signal is set to the logic '1' level. The output signal $O_s$ obtained from the neural network at that time is compared with the teaching signal, and the difference between these (i.e. amount of error) is supplied to a coefficient adjustment processing section 52, which operates in accordance with a suitable algorithm to generate signals for effecting adjustment of values of weighting coefficients within the neural network 2 in a direction that will tend to reduce the amount of error. On the other hand, if the learning input data corresponds to data other than text data, then the teaching signal value is set at logic '0'. That process is then repeated for a new set of learning input data and a corresponding new value of the teaching signal, and so on in succession. These operations are cyclically performed until a sufficient degree of convergence is reached for the weighting coefficients of the network, for each of various different sets of learning input data, which correspond to various different conditions of generating the input image data (e.g. varying degrees of tilt of a document page which is scanned to generate the image data), and different conditions under which the image data processing system would operate, e.g. various values of operating temperature of the system, as expressed by respectively different values of the temperature indication value $V_T$.

Although the above embodiment has been described for the case in which signal values expressing an apparatus operating temperature are inputted to the neural network, it would be equally possible to supply signal values to the neural network which express some other operating condition of the system, whose variation may have an effect upon discrimination between text image data and non-text image data.

Figures 8, 9:
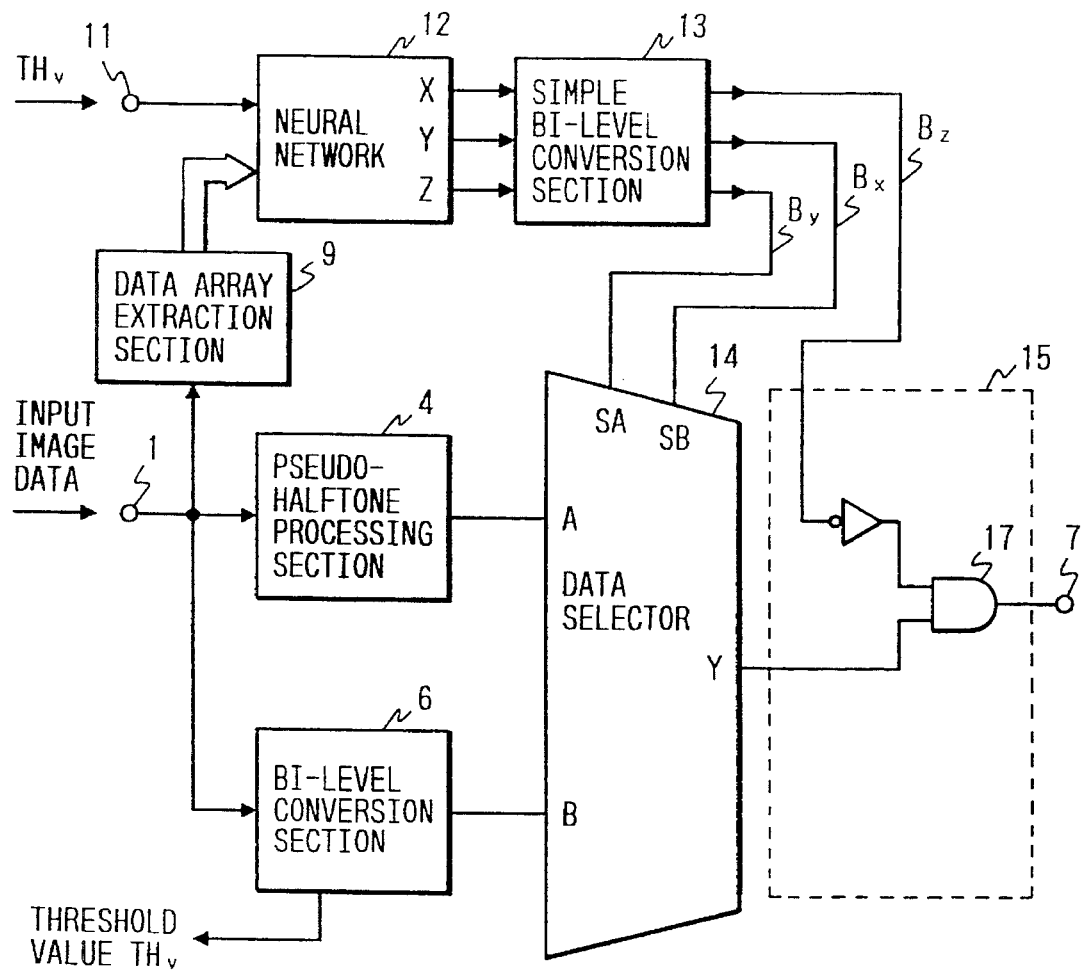
FIG. 8 is a general block system diagram of a second embodiment of an image data processing system according to the present invention.
FIG. 9 is a table of switching conditions for a data selector in the embodiment of FIG. 8.
Figures 10, 11:
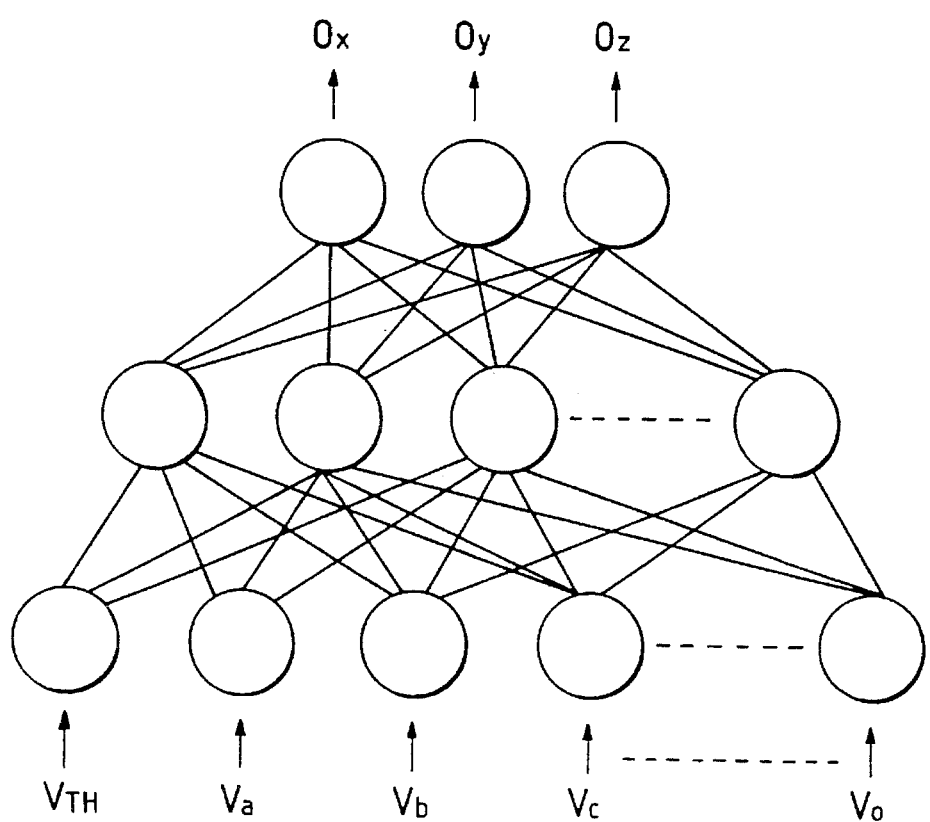
FIG. 10 shows an array of picture elements for which respective values are applied to a neural network in the embodiment of FIG. 8.
FIG. 11 illustrates the configuration of the neural network in the embodiment of FIG. 8.

A second embodiment of an image data processing system according to the present invention will be described referring to FIGS. 8, 9, 10, 11. The functions and operation of this embodiment are similar to those of the first embodiment described above, so that only the points of difference will be described in detail. In FIG. 8, as in the first embodiment, successive input image data values are applied to an input terminal 1, to be transferred to a pseudo-halftone processing section 4 and to a bi-level conversion section 6, and are also supplied to a data array extraction section 9 which extracts successive sets of picture element values from the input image data, each set corresponding to an object picture element (h) and adjacent surrounding picture elements of an original image as illustrated in FIG. 10, with each extracted set of picture element values being inputted to a neural network. However in this embodiment, the neural network 12 produces three output signals, designated as $O_x$, $O_y$ and $O_z$ from respective output terminals X, Y and Z. In addition, the value of the threshold value which is currently being utilized within the bi-level conversion section 6, for converting the input image data to binary signal form, is supplied via an input terminal 11 to an input of the neural network 12. The neural network 12 functions such that, if the object picture element value is judged to be a text image datum, then the output signal $O_x$ becomes close to the '1' level, while both the output signals $O_y$ and $O_z$ become close to the '0' level. If the object picture element value is judged to be a non-text image datum, such as a halftone image datum, then the output signal $O_y$ becomes close to the '1' level, while both the output signals $O_x$ and $O_z$ become close to the '0' level. If the object picture element value is judged to be signal noise, then the output signal $O_z$ becomes close to the '1' level, while both the output signals $O_x$ and $O_y$ become close to the '0' level.

The output signals $O_x$, $O_y$ and $O_z$ from the neural network 12 are supplied to a simple bi-level conversion section 13, to be converted to respective binary signals $B_x$, $B_y$ and $B_z$. The signals $B_x$ and $B_y$ are applied as switching control signals to a data selector 14. The data selector 14 selects the processed data from either the pseudo-halftone processing section 4 or the bi-level conversion section 6 to be transferred, via input terminals A, B and an output terminal Y, to one input of an AND gate 17 within a gating section 15. The signal $B_z$ is inverted and applied to the other input of the AND gate 17, to control transfer of the selected data from the data selector 14 to the output terminal 7 of the image data processing system.

The relationship between the states of the control signals $B_x$, $B_y$ and the selection operation of the data selector 14 is shown in the table of FIG. 9. As shown, the data selector 14 is controlled such that the processed image data from the bi-level conversion section 6 will be transferred to the AND gate 17 only under the condition that signals $B_x$ and $B_y$ are respectively '1' and '0'. Otherwise, the output data from the pseudo-halftone processing section 4 are selected.

Thus with this embodiment, if the object picture element is within a text region, the output data from the bi-level conversion section 6 are selected to be transferred through the AND gate 17 to output terminal 7, since the signal $B_z$ will be at the '0 level (so that AND gate 17 is enabled). Similarly, if the object picture element is within a halftone region, the output data from the pseudo-halftone processing section 4 are selected to be transferred through the AND gate 17 to output terminal 7. However if the object picture element value is actually noise, so that signal $B_z$ goes to the '1' level, then the output data supplied to terminal 7 will be fixed at the '0' level.

Furthermore, the accuracy of discrimination between halftone image data, text image data, and noise, by the neural network 12, will not be affected by changes in the threshold value at which the bi-level conversion section 6 is operating, since that threshold value is inputted as a variable to the neural network.

An example of the configuration of the neural network 12 of this embodiment is shown in FIG. 11. This differs from the neural network of the first embodiment in that the output layer is formed of three neuron elements, which respectively produce the aforementioned output signals $O_x$, $O_y$ and $O_z$. In addition, the threshold value that is currently utilized within the bi-level conversion section 6 is applied, as signal value $V_{th}$, to one element of the neural network input layer.

Figure 12:
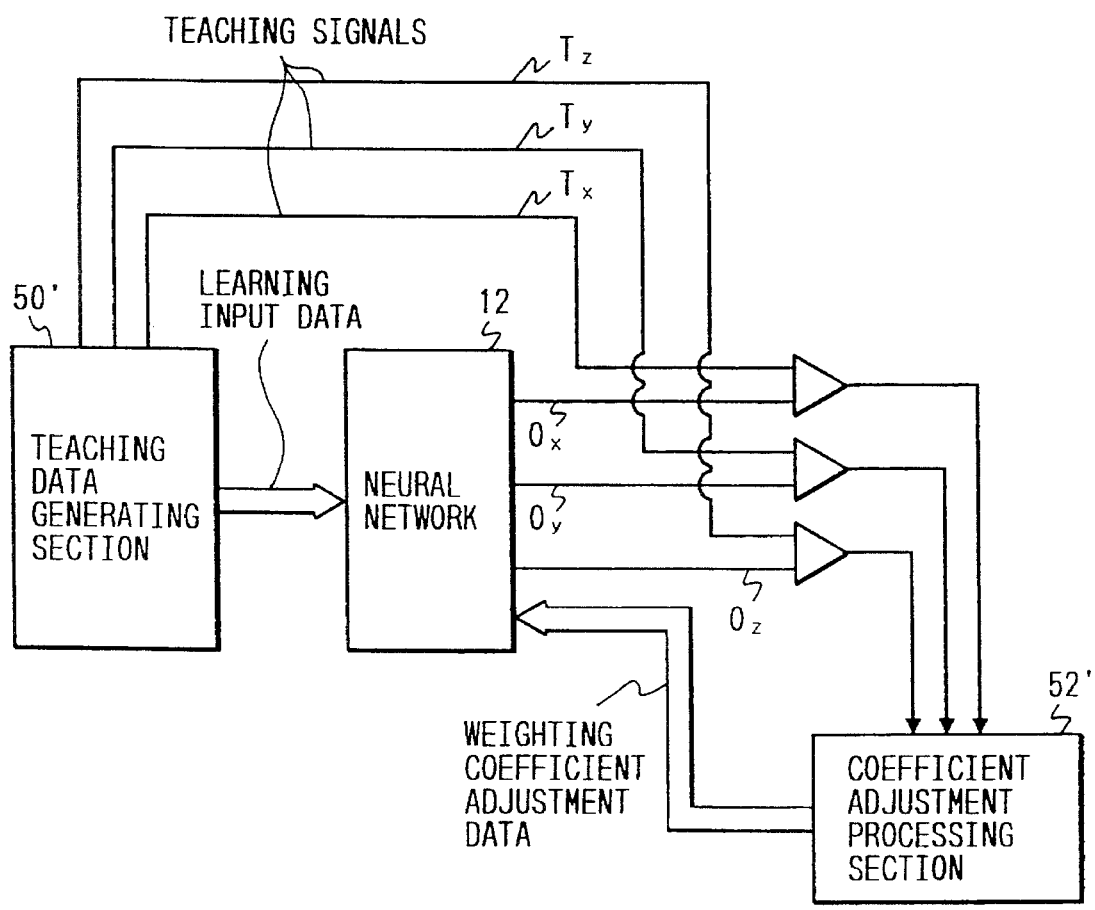
FIG. 12 is a conceptual block system diagram for describing a learning procedure which is applied to the neural network of the embodiment of FIG. 8.
Figure 13:
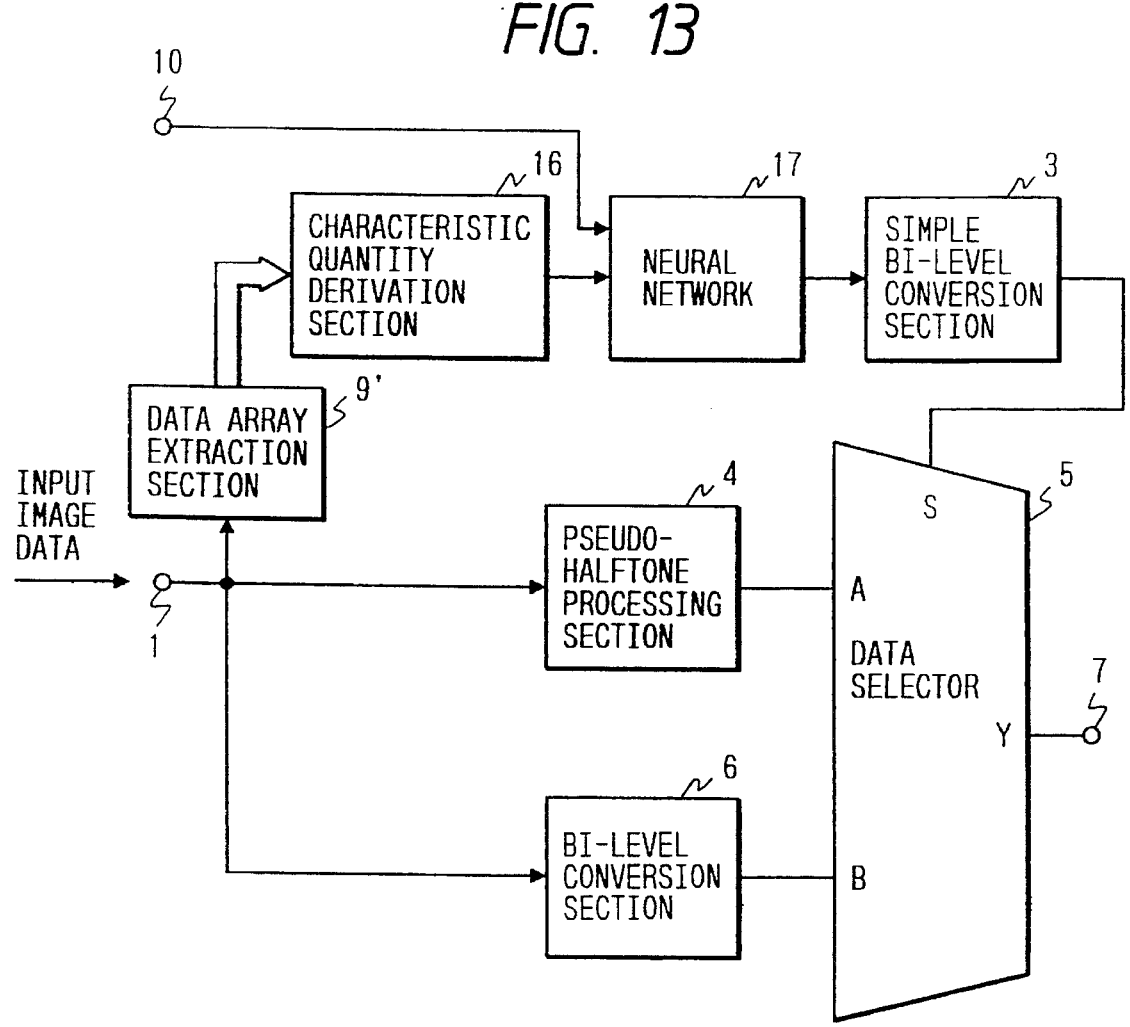
FIG. 13 is a general block system diagram of a third embodiment of an image data processing system according to the present invention.

The learning procedure which must be executed for the neural network 12 of this embodiment prior to actual operation will be described referring to FIG. 12. In this case, since there are three output signals produced from the neural network, it is necessary to compare these with three corresponding teaching signals $T_x$, $T_y$ and $T_z$, which are produced from the teaching data generating section 50'. The learning procedure is executed in a similar manner to that described above for the first embodiment, with successive combinations of 16 signal values being generated by the teaching data generating section 50' and supplied to the input layer of the neural network 12. However each combination of learning input data consists of a value of threshold value for the bi-level conversion section 6, together with a set of 15 image data values, corresponding to the signal values $V_{th}$ and Va to Vo shown in FIG. 11. As each learning input data combination is supplied to the neural network, the neural network output signal $O_x$ is compared with the teaching signal $T_x$, output signal $O_y$ is compared with the teaching signal $T_y$, and output signal $O_z$ is compared with the teaching signal $T_z$. The results of these comparisons, i.e. three error values, are supplied to a coefficient adjustment processing section 52', which generates weighting coefficient adjustment data that are supplied to the neural network 12, for adjusting the weighting coefficients of the network in a direction tending to reduce the amounts of error. That is to say, when a learning input data combination is supplied to the neural network 12 in which the object picture element value is a text image datum, then the teaching signal $T_x$ is set at the '1' level, and the signals $T_y$, $T_z$ each set at the '0' level. When a learning input data combination is supplied to the neural network 12 in which the object picture element value is a halftone image datum, then the teaching signal $T_y$ is set at the '1' level, and the signals $T_x$, $T_z$ each set at the '0' level. When a learning input data combination is supplied to the neural network 12 in which the object picture element value is a noise value, then the teaching signal $T_z$ is set at the '1' level, and the signals $T_x$, $T_y$ each set at the '0' level.

In the above description of the second embodiment, the threshold value signal $V_{th}$ is supplied to the input layer of the neural network, together with the signal values from the data array extraction section 9. However it would be possible in addition to supply an apparatus temperature indication signal to the input layer of the neural network, as in the first embodiment.

A third embodiment of an image data processing system according to the present invention will be described referring to FIGS. 13, 14, 15, 16. The functions and operation of this embodiment are basically similar to those of the first embodiment described above, so that only the points of difference will be described in detail. As for the first embodiment, an input image data stream is supplied via an input terminal 1, to a pseudo-halftone processing section 4 and a bi-level conversion section 6, with resultant processed image data from either the pseudo-halftone processing section 4 or the bi-level conversion section 6 being selected to be transferred to an output terminal 7, under the control of a signal obtained by bi-level conversion of the output signal from a neural network 17, by a simple bi-level conversion section 3. The essential point of difference is that the third embodiment is provided with a characteristic quantity derivation section 16, which derives various characteristic quantities from a set of picture element values that are extracted from the input image data stream by a data array extraction section 9', i.e. a set of picture element values including the object picture element and adjacent picture element values, corresponding to the array of 9 picture elements shown in FIG. 15. In FIG. 15, the picture element array consists of three adjacent rows, made up of picture elements which are designated a, b, c, . . . i, with picture element e being the object picture element. The respectively corresponding 9 picture element values contained in the input image data supplied to input terminal 1 will be designated as $V_a$, $V_b$, $V_c$, . . . $V_i$.

In this embodiment, the characteristic quantity derivation section 16 derives, for each array of picture element values extracted by the data array extraction section 9', a corresponding set of 14 characteristic quantities which will be designated as $Q_0$ to $Q_{13}$. These characteristic quantities are respectively derived in the characteristic quantity derivation section 16 by executing the following computations, in which the "x-direction" and "y-direction" respectively refer to the horizontal and vertical directions of the picture element array:

(1) Average level of image signal:

$$Q_0 = \frac{V_a + V_b + V_c + V_d + V_e + V_f + V_g + V_h + V_i}{9}$$

(2) Average level of image signal along x-direction:

$$Q_1 = \frac{V_d + V_e + V_f}{3}$$

(3) Average level of image signal along y-direction:

$$Q_2 = \frac{V_b + V_e + V_h}{3}$$

(4) Average level of image signal along oblique direction:

$$Q_3 = \frac{V_a + V_e + V_i}{3}$$

(5) Differential values of image signal along 8 directions:

$Q_5 = V_a - V_e$ $Q_6 = V_b - V_e$ $Q_7 = V_c - V_e$ $Q_8 = V_d - V_e$ $Q_9 = V_f - V_e$ $Q_{10} = V_g - V_e$ $Q_{11} = V_h - V_e$ $Q_{12} = V_i - V_e$ (6) Value of object picture element, in image signal:

$Q_{13} = V_e$

Although with this embodiment the above 13 characteristic quantities are utilized, it would be equally possible to use only some of these characteristic quantities, or to envisage other characteristic quantities which could be used.

These characteristic quantities, together with a temperature indication signal value which is supplied to the input terminal 10 (as for the first embodiment described above) are applied to the input layer of the neural network 17. The neural network 17 functions such as to produce an output signal $O_s$ which is close to the '1' level if the combination of input values applied to the input layer indicates that the object picture element is part of a text region, and otherwise to produce the output signal $O_s$ at a value close to the '0' level.

FIG. 16 shows the configuration of the neural network 17. This is similar to the neural network of the first embodiment, and differs only in that the characteristic quantities $V_0$ to $V_{13}$ (and the temperature indication value $V_T$) are respectively supplied to the elements which constitute the input layer of the neural network.

Figure 14:
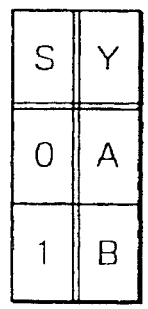
FIG. 14 is a table of switching conditions for a data selector in the embodiment of FIG. 13.
Figures 15, 16:
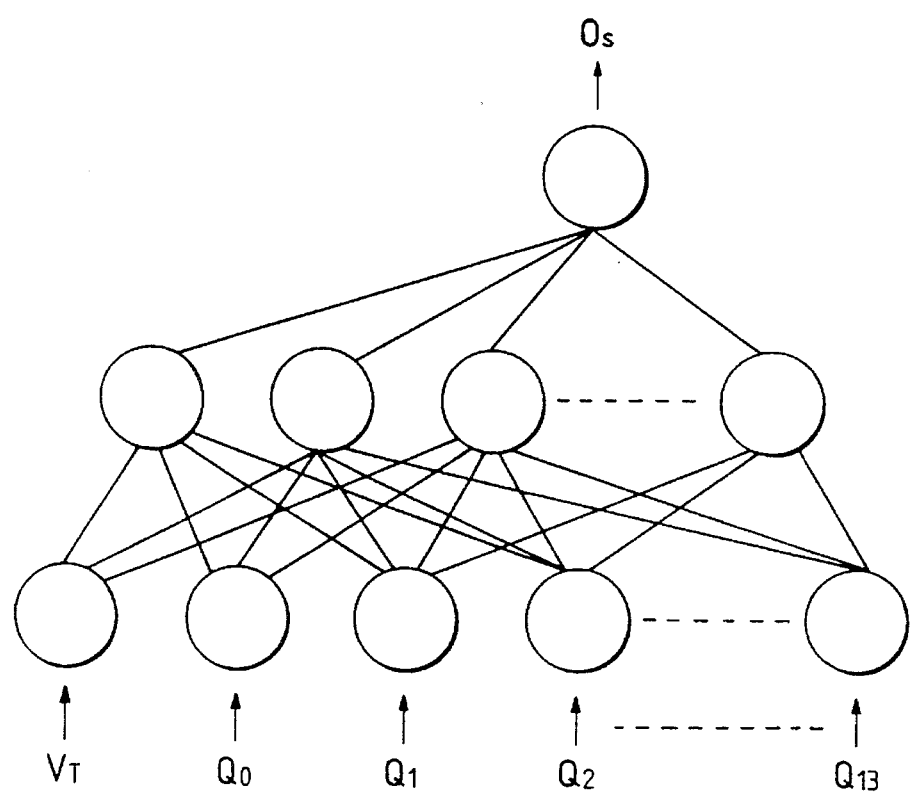
FIG. 15 shows an array of picture elements for which respective values are applied to a neural network in the embodiment of FIG. 13.
FIG. 16 illustrates the configuration of the neural network in the embodiment of FIG. 13.

The operation of this embodiment is similar to that of the first embodiment described above, with the data selector 5 being controlled by the output signal from the simple bi-level conversion section 3 as shown in the table of FIG. 14. During each sample period of the input image data, if the neural network judges (based on the the combination of states of the set of characteristic quantities produced from the data array extraction section 9' and the temperature indication value supplied in that period) that the object picture element is within a text region of the source image, then the output signal $O_s$ of the neural network becomes close to the '1' level, while otherwise the signal $O_s$ becomes close to the '0' level. Corresponding binary values are produced from the simple bi-level conversion section 3, to be supplied as a switching control signal to the S input of the data selector 5. In that way, the output data from either the pseudo-halftone processing section 4 or from the bi-level conversion section 6 are appropriately selected to be transferred by the data selector 5 to the output terminal 7.

Figure 7:
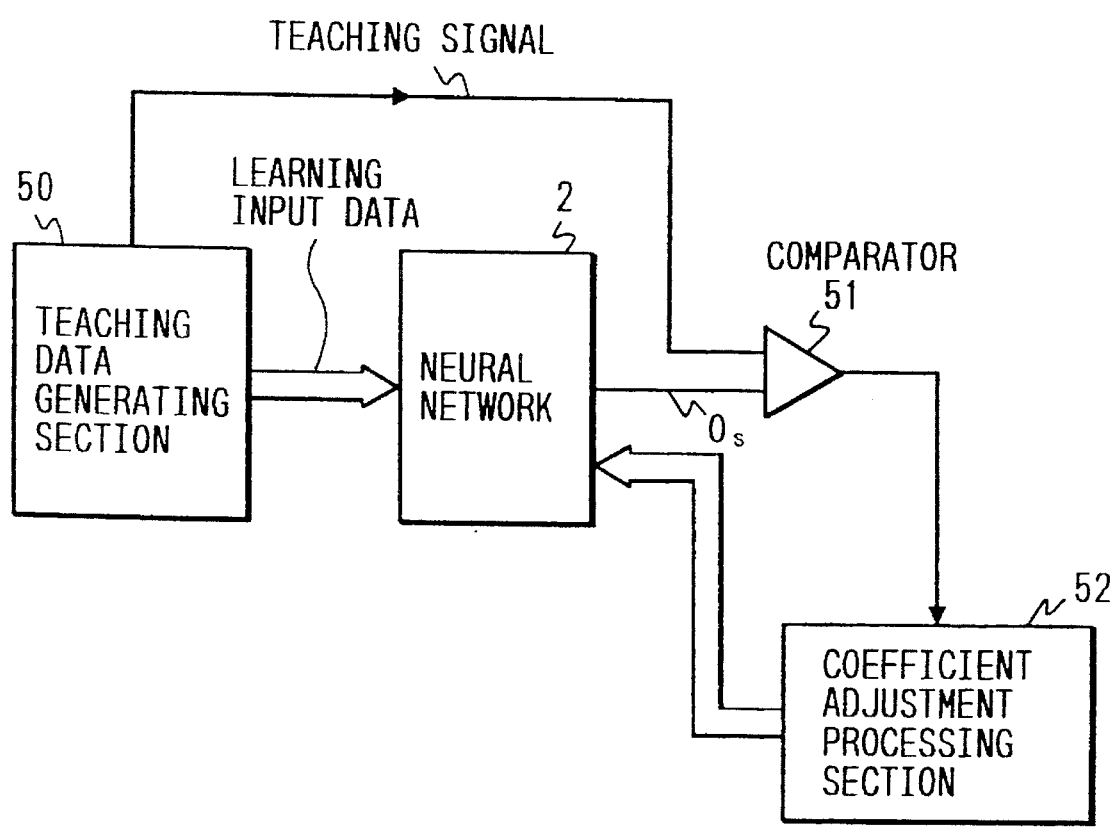
FIG. 7 is a conceptual block system diagram for describing a learning procedure which is applied to the neural network of the embodiment of FIG. 3.

The learning procedure for the neural network 17 of this embodiment is similar to that described above for the first embodiment of the invention, referring to FIG. 7. However with the third embodiment, each combination of signal values produced from the teaching data generating section 50, constituting learning input data for the neural network 17, will represent either a set of characteristic quantities and a temperature indication value which correspond to the case in which the object picture element is part of a text image region, in which case the corresponding value of the teaching signal is set to the '1' level, or a set of characteristic quantities and a temperature indication value which correspond to the case in which the object picture element is not part of a text image region, e.g. is part of a halftone image region, in which case the teaching signal is set at the '0' level. Apart from that point, the learning procedure is executed in the same way as described for the first embodiment.

A fourth embodiment of an image data processing system according to the present invention will be described referring to FIGS. 17, 18 and 19. The functions and operation of this embodiment are basically similar to those of the first embodiment described above, so that only the points of difference will be described in detail. As for the first embodiment, input image data are supplied via an input terminal 1 to a pseudo-halftone processing section 4 and a bi-level conversion section 6, with resultant processed image data from either the pseudo-halftone processing section 4 or the bi-level conversion section 6 being selected to be transferred to an output terminal 7, under the control of a binary signal which is obtained by a simple bi-level conversion section 3 which operates on the output signal from an neural network 18. The essential point of difference between this embodiment and the first embodiment is based on the fact that with the first embodiment, when the neural network has assigned the object picture element to a specific category during one image signal period (e.g. the category "text image data") then there is a high probability that the succeeding picture element (i.e. the object picture element during the next image signal period) will fall into the same category. That is to say, there is a high probability of occurrence of a run of successive picture element values which fall into the same category. For that reason, with the fourth embodiment, the output signal value derived for the preceding object picture element is fed back to the neural network, i.e. is delayed by an appropriate amount, and the delayed value applied to the input layer of the neural network. Improved performance can thereby be attained for the neural network.

Figures 17, 18:
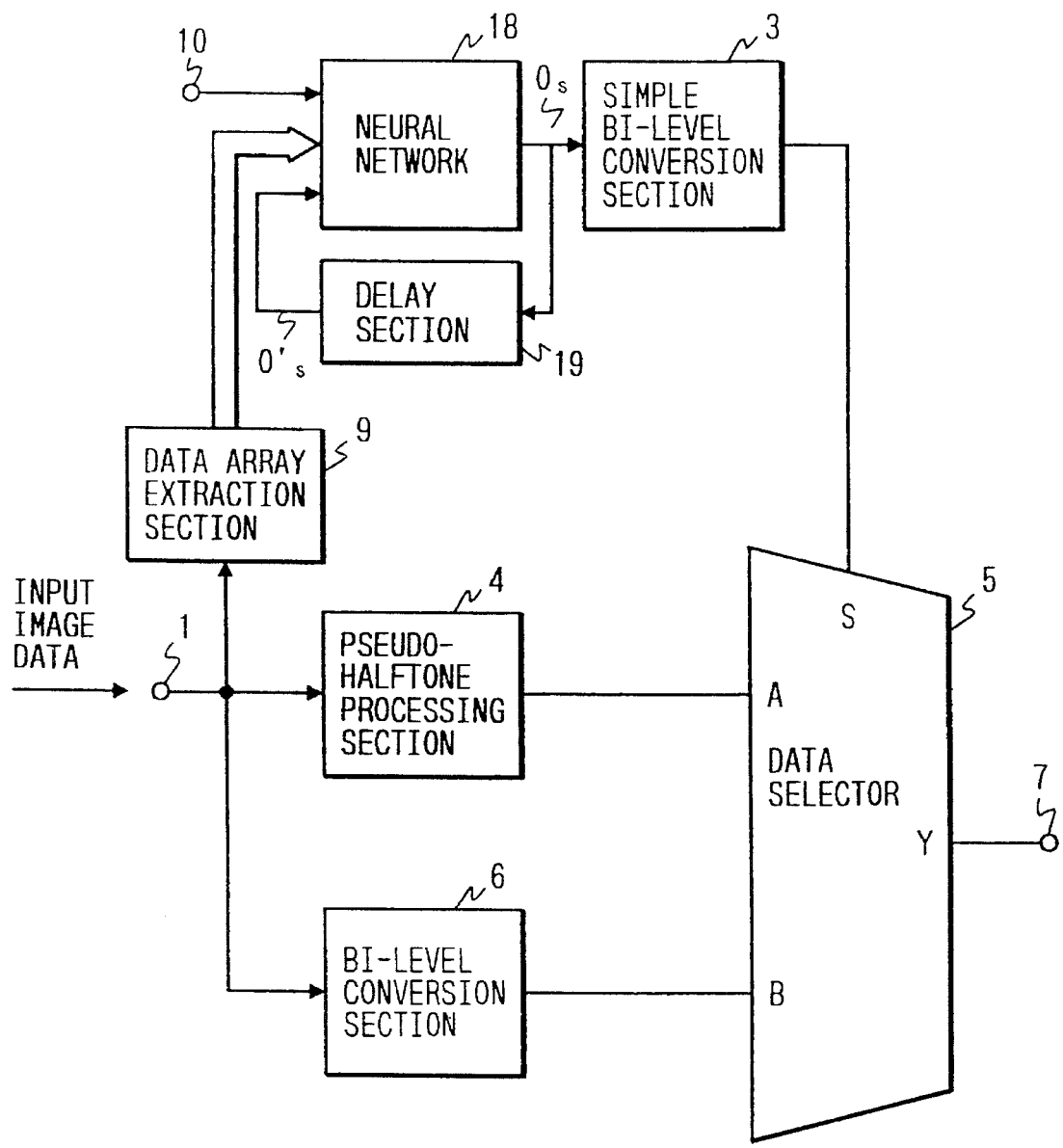
FIG. 17 is a general block system diagram of a fourth embodiment of an image data processing system according to the present invention.
FIG. 18 is a table of switching conditions for a data selector in the embodiment of FIG. 17.

Thus, as shown in FIG. 17, the output signal $O_s$ from the neural network 18 of this embodiment is supplied not only to the simple bi-level conversion section 3 but also to a delay section 19, which produces an amount of delay $t_d$ that is expressed as:

$$t_d = \{(1\,image\ data\ period) - (forward\ propagation\ delay\ through\ neural\ network)\}$$

The data selector 5 of this embodiment is controlled in the same way as for the first embodiment, as shown by the table of FIG. 18. The array of picture elements extracted from the input image data by the data array extraction section 9 of this embodiment is the same as that of the first embodiment.

Figure 19:
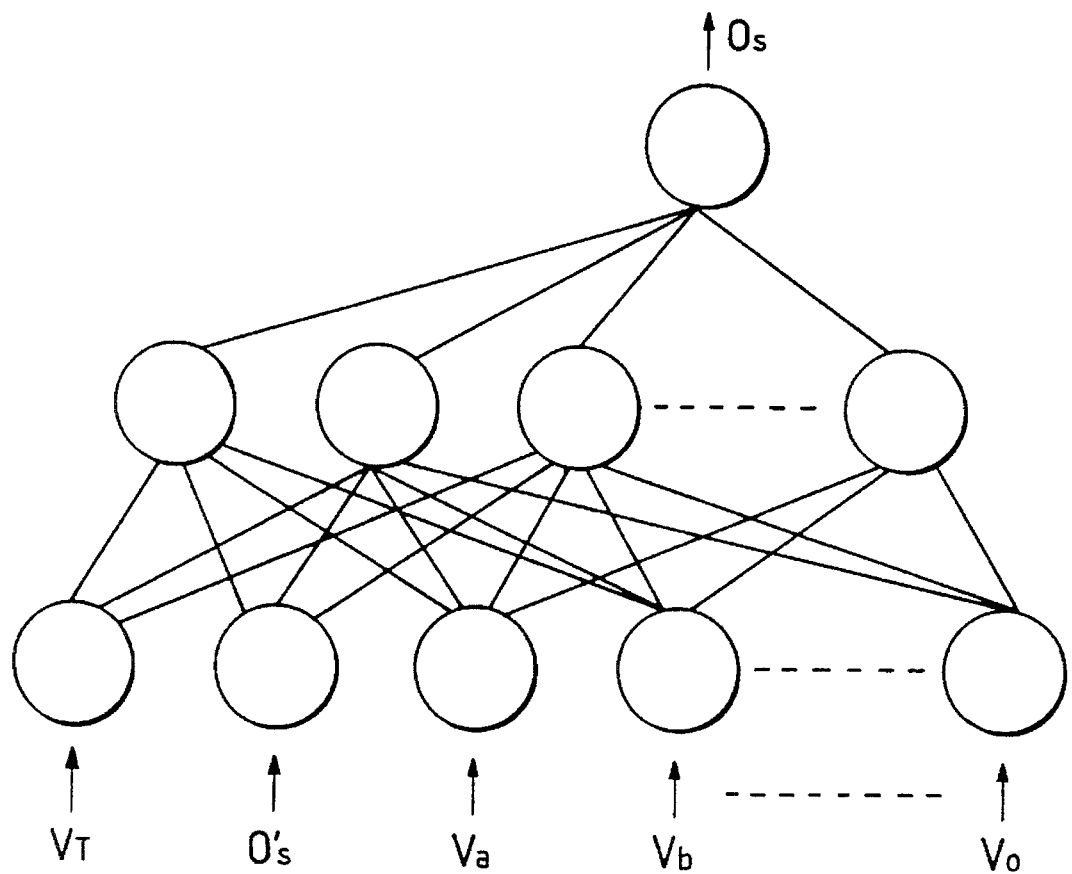
FIG. 19 illustrates the configuration of a neural network in the embodiment of FIG. 17.

The configuration of the neural network 18, as shown in FIG. 19, differs from the neural network of the first embodiment only in that the delayed output signal $O_s'$ produced from the delay section 19 is applied to one of the elements constituting the input layer.

It will be understood that various modifications to the above embodiments could be envisaged, which fall within the scope claimed for the present invention. For example, by providing a suitable number of elements as the input layer of the neural network 18 and using a suitable neural network learning procedure, the above embodiment could be modified by also inputting to the neural network a signal indicative of a condition of generating the input image data, such as the temperature indication signal $V_T$ of the first embodiment, and/or by inputting to the neural network the threshold value $V_{th}$ of the second embodiment, and to configure the embodiment such as to clamp the output terminal 7 at one binary logic level when it is judged by the neural network that the object picture element value falls within the category of noise, as is done in the second embodiment. Hence, the above description of specific embodiments should be taken in a descriptive and not in a limiting sense.

What is claimed is:

1. An image data processing system for operating on a stream of input image data including successive multi-level picture element values supplied in respective sample periods, for selectively processing said input image data in accordance with a plurality of predetermined categories of said input image data, the system comprising:

data array extraction means for extracting from said input image data stream, in each of said sample periods, a set of picture element values including an object picture element value, said set corresponding to an array of successively adjacent picture elements;

characteristic quantity derivation means for operating on said set of picture element values to derive a set of characteristic quantities, said characteristic quantities expressing respectively different parameters of said array of successively adjacent picture elements;

a plurality of image processing means each coupled to receive said image data stream, functioning in each of said sample periods to generate respective processed image data in response to said object picture element value;

neural network means which has been subjected to a predetermined learning procedure, responsive to said set of characteristic quantities for judging said object picture element value as being within a specific one of said categories, and for producing output data indicative of said specific category; and data selector means controlled by said output data from said neural network means for selecting processed image data produced from one of said plurality of image processing means.

2. An image data processing system according to claim 1, wherein said characteristic quantity derivation means comprises means for calculating, as one of said characteristic quantities, an average value of said set of picture element values.

3. An image data processing system according to claim 1, wherein said characteristic quantity derivation means comprises means for calculating, as one of said characteristic quantities, an average value of a subset of said set of picture element values, said subset corresponding to a linearly successively adjacent group of said picture elements within said array.

4. An image data processing system according to claim 1, further comprising means for delaying said output data produced from said neural network means during said each sample period, to obtain delayed output data, and for inputting said delayed output data to said neural network means in an immediately succeeding sample period.

5. An image data processing system according to claim 1, wherein said image data processing system is further supplied with operating condition data relating to an apparatus operating condition which affects said judgement executed by said neural network, and wherein said operating condition data are inputted to said neural network in conjunction with said set of characteristic quantities.

6. An image data processing system according to claim 1, wherein one of said plurality of image processing means comprises bi-level conversion means for converting said input image data to binary data by comparing said input image data with a variable-level threshold value, and wherein said variable-level threshold value is inputted to said neural network means in conjunction with said set of characteristic quantities.

7. An image data processing system according to claim 1 wherein one of said categories is a signal noise category and wherein said processed image data are binary data, and further comprising means (15) responsive to output data from said neural network indicating that said object picture element is within said signal noise category, for holding a processed image data output terminal (7) of said image data processing system at a fixed logic level.

8. An image data processing system according to claim 1, wherein one of said plurality of image processing means comprises bi-level conversion means for converting said input image data to binary data by comparing said input image data with a variable-level threshold value, and wherein said variable-level threshold value is inputted to said neural network means in conjunction with said set of picture element values.

9. An image data processing system for operating on a stream of input image data including successive multi-level picture element values supplied in respective sample periods, for selectively processing said input image data in accordance with a plurality of predetermined categories of said input image data, the system comprising:

data array extraction means for extracting from said input image data stream, in each of said sample periods, a set of picture element values including an object picture element value, said set corresponding to an array of successively adjacent picture elements;

a plurality of image processing means each coupled to receive said input image data stream, functioning in each of said sample periods to generate respective processed image data in response to said object picture element value;

neural network means which has been subjected to a predetermined learning procedure, responsive to said set of picture element values for judging said object picture element value as being within a specific one of said categories, and for producing output data indicative of said specific category; and data selector means controlled by said output data from said neural network means for selecting processed image data produced from one of said plurality of image processing means, and for outputting said selected processed image data, further comprising means for delaying said output data produced from said neural network means during said each sample period, to obtain delayed output data, and for inputting said delayed output data to said neural network means in an immediately succeeding sample period.

10. An image data processing system for operating on a stream of input image data including successive multi-level picture element values supplied in respective sample periods, for selectively processing said input image data in accordance with a plurality of predetermined categories of said input image data, the system comprising:

data array extraction means for extracting from said input image data stream, in each of said sample periods, a set of picture element values including an object picture element value, said set corresponding to an array of successively adjacent picture elements;

a plurality of image processing means each coupled to receive said input image data stream, functioning in each of said sample periods to generate respective processed image data in response to said object picture element value;

neural network means which has been subjected to a predetermined learning procedure, responsive to said set of picture element values for judging said object picture element value as being within a specific one of said categories, and for producing output data indicative of said specific category; and data selector means controlled by said output data from said neural network means for selecting processed image data produced from one of said plurality of image processing means, and for outputting said selected processed image data, wherein one of said plurality of image processing means comprises bi-level conversion means for converting said input image data to binary data by comparing said input image data with a variable-level threshold value, and wherein said variable-level threshold value is inputted to said neural network means in conjunction with said set of picture element values.

11. An image data processing system for operating on a stream of input image data including successive multi-level picture element values supplied in respective sample periods, for selectively processing said input image data in accordance with a plurality of predetermined categories of said input image data, the system comprising:

data array extraction means for extracting from said input image data stream, in each of said sample periods, a set of picture element values including an object picture element value, said set corresponding to an array of successively adjacent picture elements;

a plurality of image processing means each coupled to receive said input image data stream, functioning in each of said sample periods to generate respective processed image data in response to said object picture element value;

neural network means which has been subjected to a predetermined learning procedure, responsive to said set of picture element values for judging said object picture element value as being within a specific one of said categories, and for producing output data indicative of said specific category; and data selector means controlled by said output data from said neural network means for selecting processed image data produced from one of said plurality of image processing means, and for outputting said selected processed image data, wherein one of said categories is a signal noise category and wherein said processed image data are binary data, and further comprising means (15) responsive to output data from said neural network indicating that said object picture element is within said signal noise category, for holding a processed image data output terminal (7) of said image data processing system at a fixed logic level.

12. An image data processing system for operating on a stream of input image data representing an image and including successive multi-level picture element values supplied in respective sample periods and representing successive portions of said image to be transmitted, for selectively processing said input image data in accordance with at least first and second predetermined categories of said input image data, said first category identifying data expressing a picture region of an image and said second category identifying data expressing a region of printed characters of an image, the system comprising:

data array extraction means for extracting from said input image data stream, in each said sample period, a respective set of picture element values including a respective object picture element value, said respective set of picture element values corresponding to an array of successively adjacent picture elements;

characteristic quantity derivation means for operating on said set of picture element values to derive by arithmetic calculations, in each said sample period, a respective set of characteristic quantities expressing respectively different parameters of said array of successively adjacent picture elements;

a plurality of image processing means each coupled to receive said input image data stream, functioning in said each sample period to generate respective processed image data in response to said respective object picture element value;

neural network means which has been subjected to a predetermined learning procedure, responsive in each said sample period to said respective set of characteristic quantities for judging each said object picture element value as being within a respective one of said first and second categories and for producing, in each said sample period, output data indicative of said respective one of said categories; and data selector means controlled by said output data from said neural network means for selecting, in each said sample period, processed image data produced from a respectively corresponding one of said plurality of image processing means corresponding to said respective category.

* * * * *